(12) United States Patent
Lentz et al.

(10) Patent No.: US 6,295,060 B1
(45) Date of Patent: Sep. 25, 2001

(54) METHOD OF QUICKLY EXPANDING LARGE LISTS OF COMPRESSED DATA

(75) Inventors: James Lee Lentz; Ricky Lee Poston, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/210,208

(22) Filed: Dec. 10, 1998

(51) Int. Cl.[7] ........................................ G06F 15/00
(52) U.S. Cl. ............................................ 345/339
(58) Field of Search .................................. 345/439, 433, 345/349, 339, 355, 350, 357, 341

(56) References Cited

U.S. PATENT DOCUMENTS

| | | | |
|---|---|---|---|
| 5,206,950 | 4/1993 | Geary et al. | 395/600 |
| 5,689,669 | 11/1997 | Lynch et al. | 395/355 |
| 5,905,498 * | 5/1999 | Diament | 345/356 |
| 6,072,493 * | 5/1999 | Driskell et al. | 345/356 |

* cited by examiner

*Primary Examiner*—Phu K. Nguyen
(74) *Attorney, Agent, or Firm*—Volel Emile (57) ABSTRACT

A method and apparatus for quickly expanding a compressed list of items on a display system are provided. The method entails displaying the compressed list of items and expanding the displayed compressed list of items by displaying a non-displayed item halfway between two displayed items when a pointer touches the two displayed items. If the pointer only touches one displayed item, a non-displayed item halfway between the displayed item touched and the displayed item immediately above as well as that immediately below the displayed item touched will be displayed. If, on the other hand, the pointer touches three displayed items, a non-displayed item halfway between each pair of the three displayed items touched will be displayed.

9 Claims, 12 Drawing Sheets

METHOD OF QUICKLY EXPANDING LARGE LISTS OF COMPRESSED DATA

CROSS REFERENCE TO RELATED APPLICATIONS

The present application is related to the following applications: (1) application Ser. No. 09/210,205 entitled "Method of Vertically Compressing a Large List of Data to Fit on a Screen" (2) application Ser. No. 09/210,206, entitled "Method of Geometrically Expanding Vertically Compressed Lists of Data" and (3) application Ser. No. 09/210,207, entitled "Method of Compressing and Expanding Large Lists of Data". All three applications were filed on the same day and assigned to the same assignee as the present application.

BACKGROUND OF THE INVENTION

1. Field of the Invention

The present invention relates to user interactive computer supported display technology and more particularly to such user interactive systems and methods which are user friendly and provide easy to use interactive user interfaces.

2. Description of the Related Art

The 1990's decade has been marked by a technological revolution driven by the convergence of the data processing industry with the consumer electronics industry. This advance has been even further accelerated by the extensive consumer and business involvement in the internet over the past few years. As a result of these changes, it seems as if virtually all aspects of human endeavor in the industrialized world requires the distribution of information through interactive computer display interfaces. Information for reporting, marketing, technology and educational purposes, which in the past was permitted days and even months for distribution, are now customarily required to be "on-line" in a matter of hours and even minutes. The electronic documents through which such information is distributed is made up of a variety of information types, e.g. text, graphics, photographs and even more complex image types. Because of the limited time factors involved in the creation, updating and reading of computer displayed documents, there is a need for a method and system for navigating through these documents which are fast and relatively effective.

For example, the conventional method of allowing a user to view very large sets of data in tree, table or list format is to display every item in the list. A user then has to scroll through the displayed items to find a particular item of interest. Obviously, it is easier to find a particular item in a list of items, if only one screen is needed to display the items than if more than one screen is used. Thus, a method and system were provided to allow a list of items to be compressed such that some of the items were displayed on one screen. However, if a user wanted to find a particular item that was not displayed, the user had to expand the list of items by mouse clicking on an expand button. This was tedious and time consuming. Consequently, a faster way of expanding a compressed list of items is needed.

SUMMARY OF THE INVENTION

The need is addressed by the present invention. The invention provides a method and apparatus for quickly expanding a compressed list of items on a display system are provided. The method entails displaying the compressed list of items and expanding the displayed compressed list of items by displaying a non-displayed item halfway between two displayed items when a pointer touches the two displayed items. If the pointer only touches one displayed item, a non-displayed item halfway between the displayed item touched and the displayed item immediately above as well as that immediately below the displayed item touched will be displayed. If, on the other hand, the pointer touches three displayed items, a non-displayed item halfway between each pair of the three displayed items touched will be displayed.

DESCRIPTION OF THE INVENTION

Figure 1:
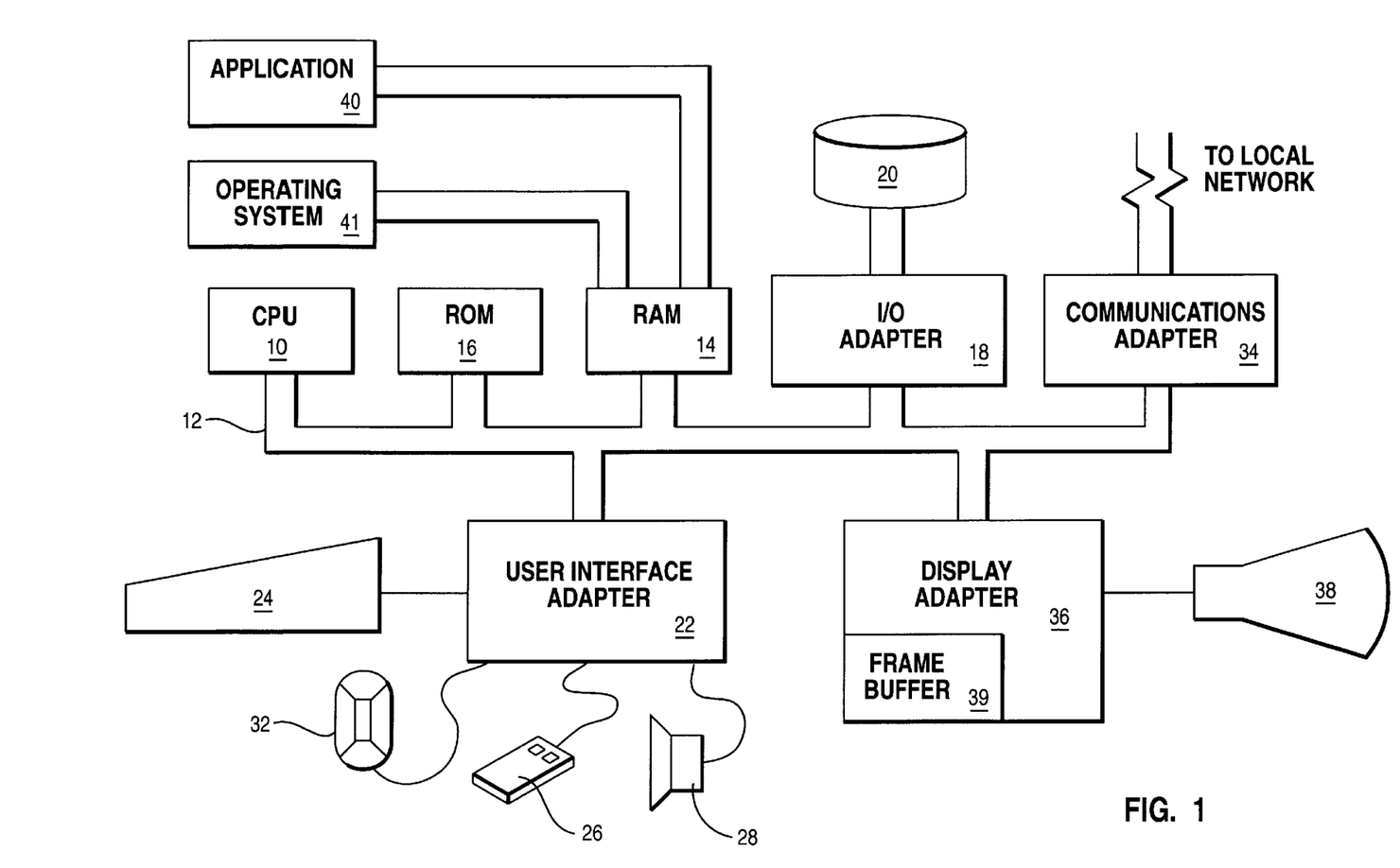
FIG. 1 is a typical data processing system is shown which may function as the computer controlled display terminal used in implementing the present invention.

Referring to FIG. 1, a typical data processing system is shown which may function as the computer controlled display terminal used in implementing the present invention. A central processing unit (CPU) 10, such as one of the PC microprocessors available from International Business Machines Corporation (IBM), is provided and interconnected to various other components by system bus 12. An operating system 41 runs on CPU 10 and provides control. The operating system 41 also coordinates the function of the various components of FIG. 1. The operating system 41 may be one of the commercially available operating systems such as the OS/2 operating system available from IBM (OS/2 is a trademark of IBM); Microsoft's Windows 95(™), Windows 98(™) or Windows NT(™), as well as the UNIX or AIX operating systems.

A program for compressing and expanding large sets of objects in a tree, table or list view, application 40, to be subsequently described in detail, runs in conjunction with the operating system 41. Application 40 provides output calls to the operating system 41. The operating system 41 implements, inter alia, the various functions performed by the application 40.

A read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. It should be noted that software components, including the operating system 41 and the application 40, are loaded into RAM 14, which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other systems over a local area network (LAN) and/or wide area network (WAN) such as the internet. I/O devices are also connected to system bus 12 via user interface adapter 22 and display adapter 36. Keyboard 24, trackball 32, mouse 26 and speaker 28 are all interconnected to bus 12 through user interface adapter 22. It is through such input devices, particularly the mouse 26, that a user may employ the present invention.

Display adapter 36 includes a frame buffer 39 which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24, trackball 32 or mouse 26 and receiving output information from the system via speaker 28 and display 38. In the preferred embodiment, which will be subsequently described, the mouse will be the input means through which the user will interface with the system. The display terminal of FIG. 1 communicates with the network through the communications adapter 34.

Figure 2:
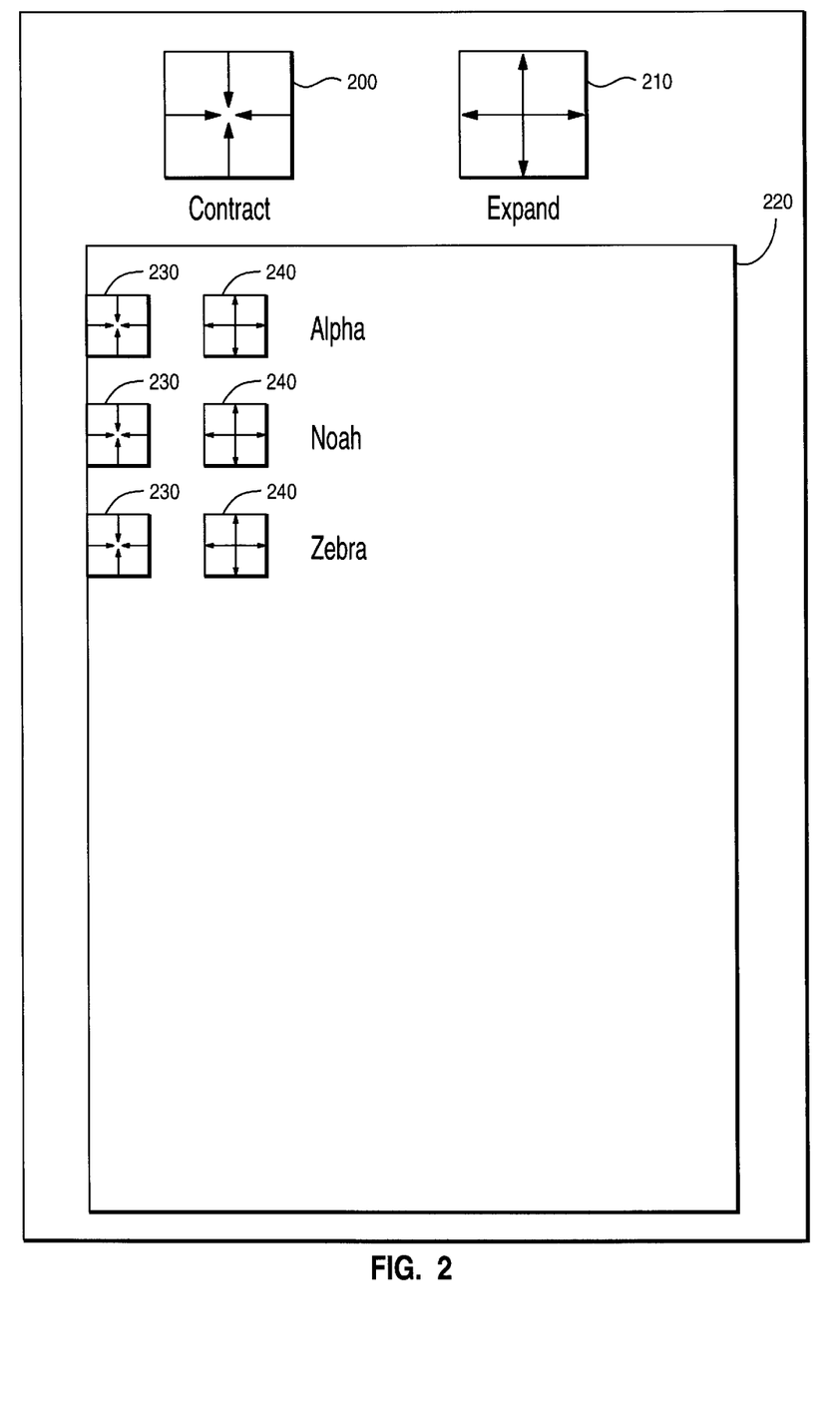
FIGS. 2, 3 and 4 are a graphical user interface (GUI) used by the present invention.

FIG. 2 is a graphical user interface (GUI) used by the present invention. The GUI has a global contract button 200, a global expand button 210 and an area 220 within which items are displayed. For example, a plurality of local contract buttons 230, local expand buttons 240 and a list of items (e.g., a list of files) are displayed in area 220.

It is obvious that it is easier to find an item when scanning through a few items on one screen than when scrolling through screens of items. Accordingly, the present invention allows for the display of a high level view of a list when a long list of items is to be displayed, especially if the list cannot be displayed on one page. The high level view may be a listing of the first item, the last item and an item in between. For instance, if the list of items to be displayed are the letters of the alphabet, the displayed items may then be alpha for the letter "A", the first letter of the alphabet, noah for the letter "N", the fourteenth letter in the alphabet, and zebra for the letter "Z", the last letter in the alphabet (see FIG. 2). Note that this is only by design that the listing is initially divided in two halves (i.e., alpha to noah and noah to zebra), any other types of initial compression scheme would work equally well. In fact, a different initial compression scheme is used in one of the examples below.

Suppose a user wants to get to file "G" or gamma in the list of files. Clearly, "G" is between the letters "A" and "N" (i.e., gamma is between alpha and noah). The first thing that needs to be done is to scroll the list so that the point in the list where the target item is thought to reside (i.e., area between the two displayed items) is at the center of the view pane. The invention is designed such that the part of a list that is at the center of the view pane before expansion remains at the center of the view pane after expansion, since it is the area of interest. Thus in this case, the area between the letters "A" and "N" should be scrolled to the center of the view pane. Then the global expand button 210 (or the local expand button 240) can be selected.

Figure 3:
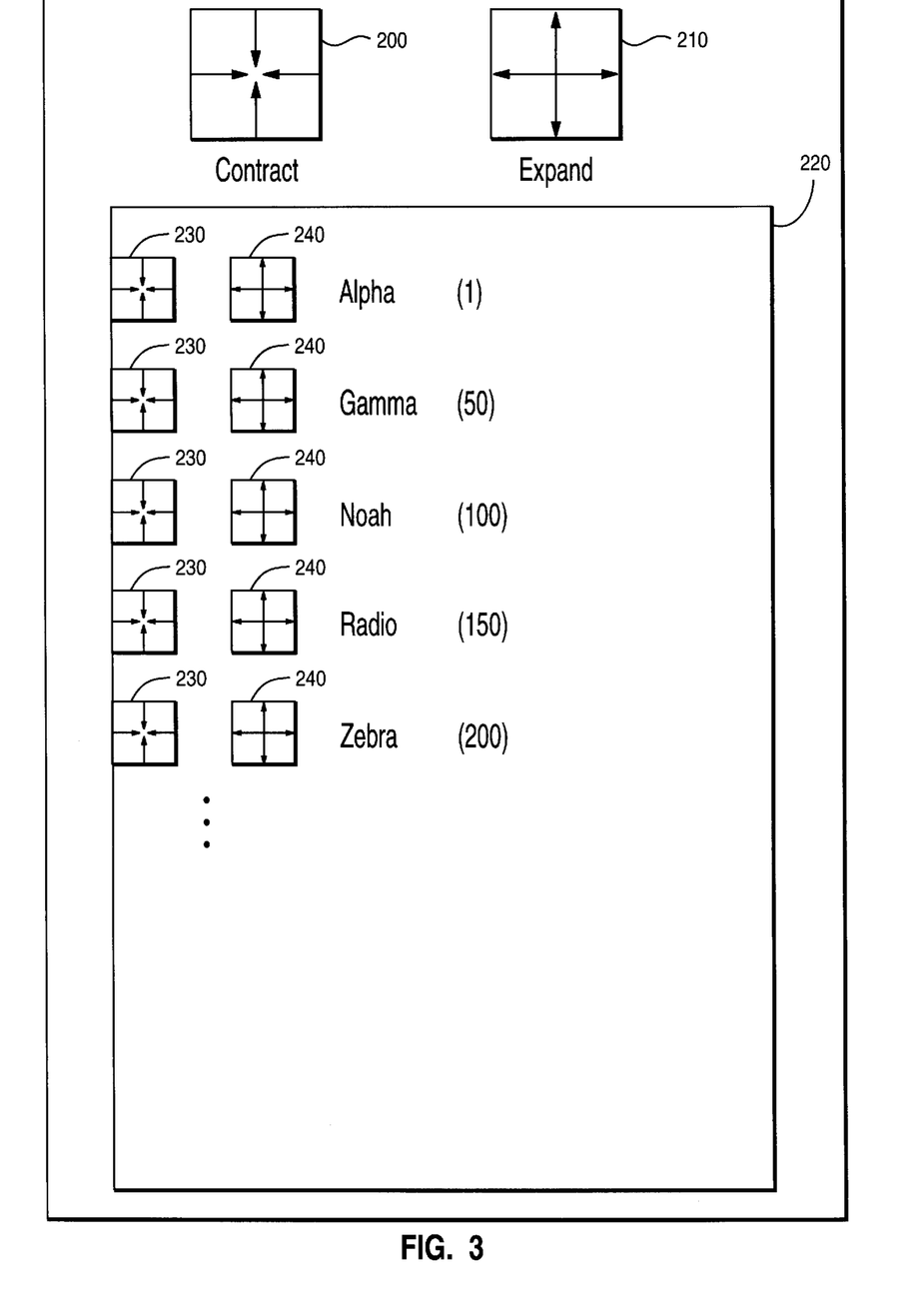

In the present embodiment of the invention, each time the global expand button 210 is selected, the number of items that are displayed is increased. Conversely, when the global contract button 200 is selected, the number of items displayed is decreased. FIG. 3 is an illustration of the additional items displayed after the global expand button 210 is selected. For example, gamma is displayed between alpha and noah and radio is displayed between noah and zebra.

Figure 4:
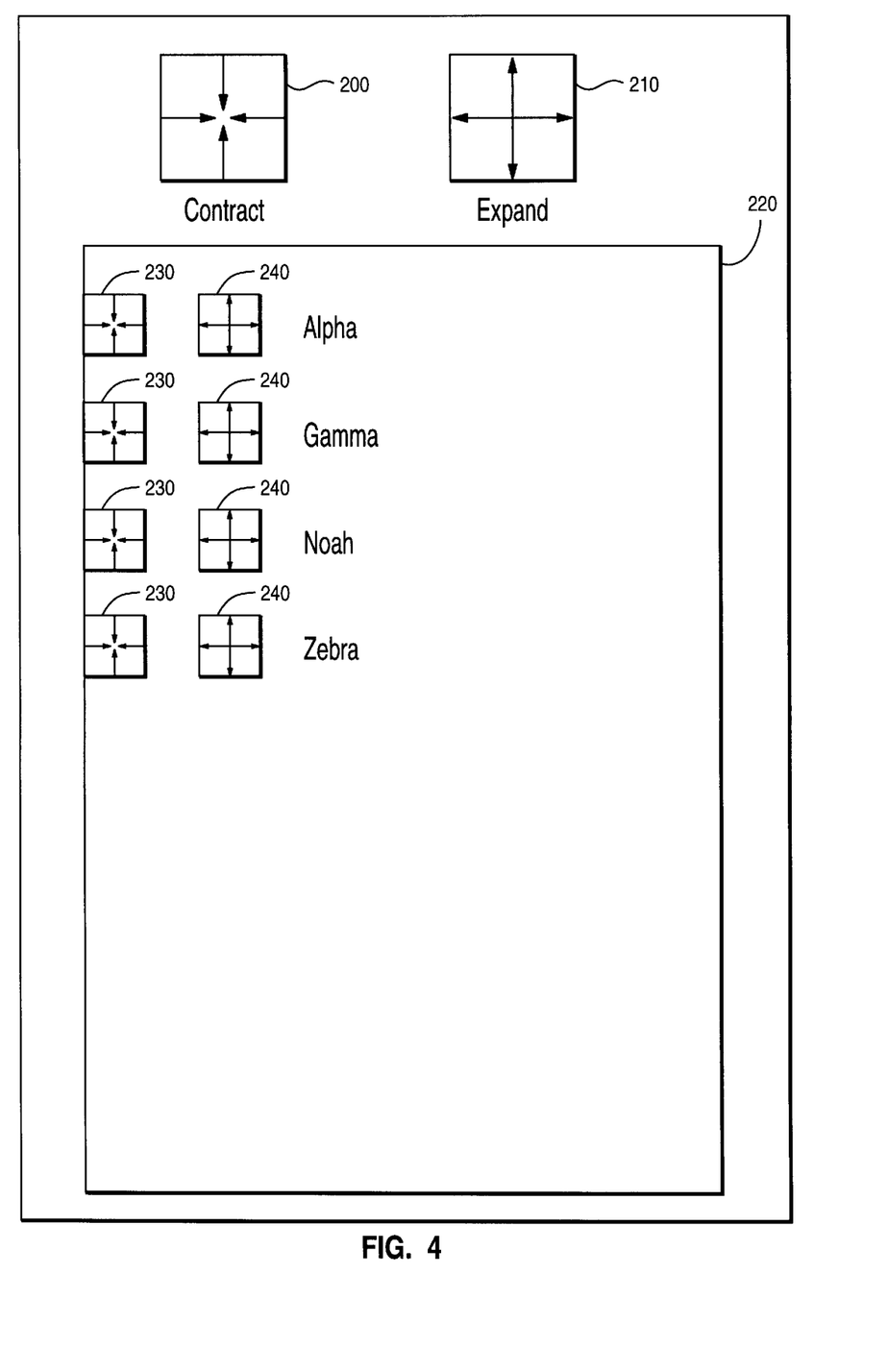

As is apparent from FIGS. 2, 3 and 4, each item displayed in area 220 has, associated with it, a local contract button 230 and a local expand button 240. Local expand button 240 is used to only expand the area where it is thought that the item of interest may reside (in contrast to the global expand button 210 used to expand the area between each pair of items). Thus, using the example above, the local button 240 associated with alpha will be used. This will enable files between alpha and noah to be displayed. Each time the local expand button 240 is selected, an item is displayed between item 1 (the item associated with the selected button) and item 2 (the item immediately below item 1). FIG. 4 is an illustration of additional items displayed after the local expand button 240 is selected. For example, gamma is the only additional item displayed. Local contract buttons 231 are used to compress a file listing between an item 1 and an item 2.

Figure 5A:
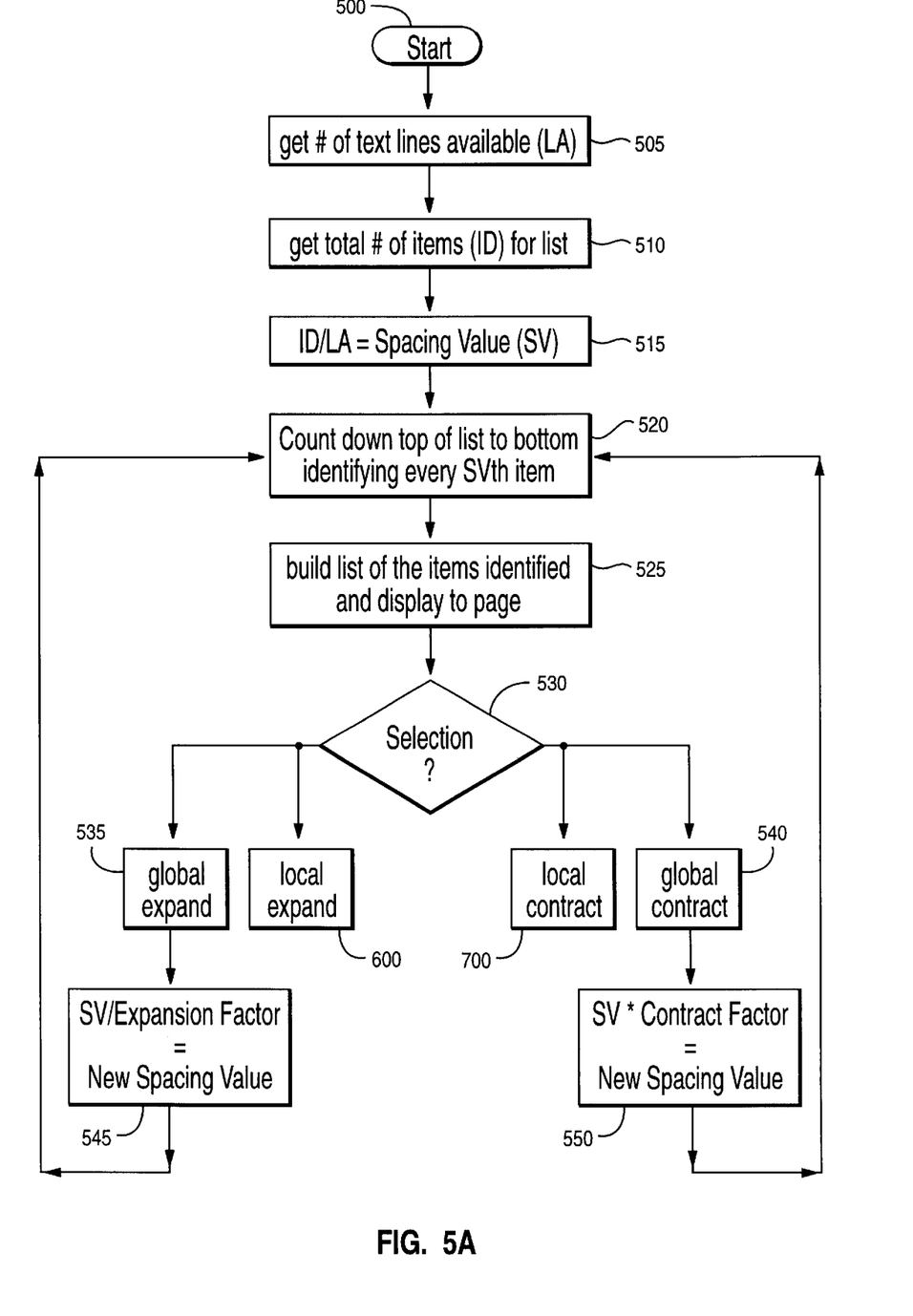
FIG. 5 is a flow chart of an implementation of the present invention.
Figure 5B:
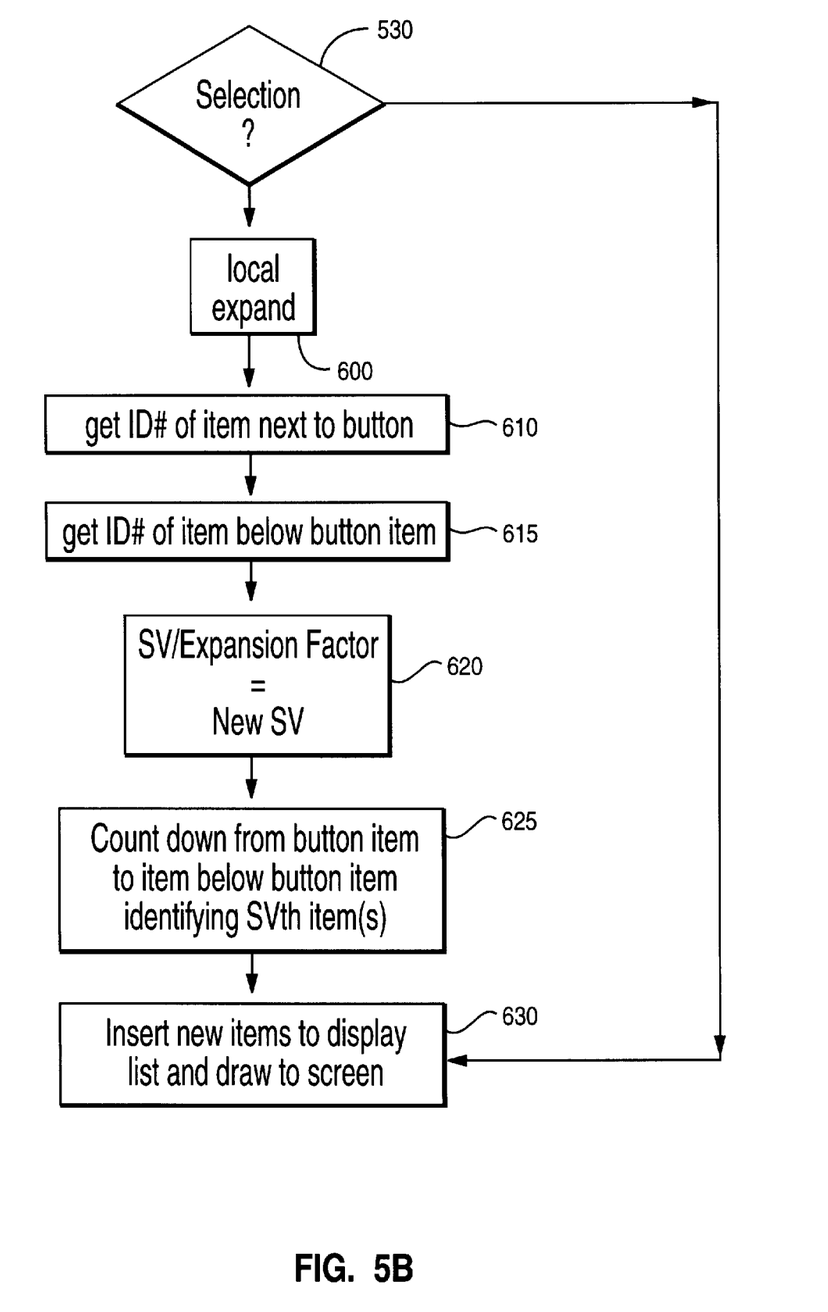
Figure 5C:
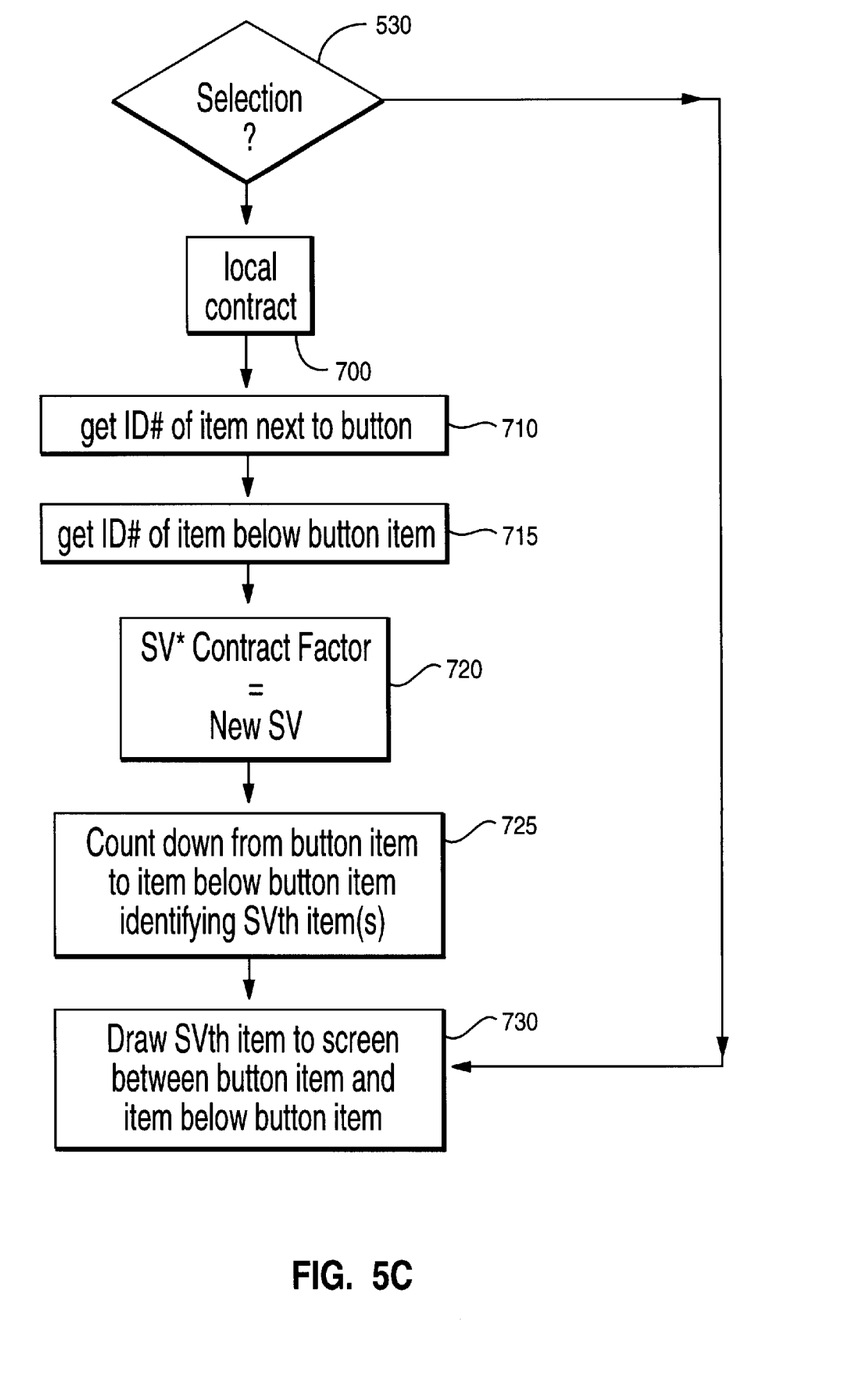

FIG. 5 is a flow chart of an implementation of the present invention. The process starts at step 500. The first things determined are the number of text lines vailable (LA) on the screen and the total number of items to be displayed (ID) (steps 505 and 510). Then, in step 515 the spacing value (SV) is calculated by dividing the number of items in the list with the number of lines on the screen (ID/LA). In step 520, the whole list is parsed identifying every SVth item. The identified items are then displayed (step 525).

At this point, a high level view of the entire list is displayed on the screen. If the user decides to do a global expand (steps 530 and 535) then in step 545 a new spacing value (SV) is calculated by dividing the present spacing value with an expansion factor and the process returns to step 520. The expansion factor used in the present invention is two (2). Thus, each time the global expand button is selected the items displayed are doubled (note that a user may have to scroll to see all the displayed items).

If instead, the global contract button is selected (steps 530, 540), then in step 550, a new spacing value (SV) is calculated by multiplying the present spacing value with a contract factor and the process returns to step 520. Just as in the expansion process, the contract factor used is two (2).

If one of the local expand buttons 240 is selected (steps 530 and 600), then the ID number of the item associated with the selected button (i.e., the ID number of the button item) would be determined (step 610). The ID number of the item below the button item would also be determined (step 615) and a new spacing value (SV) calculated by dividing the current spacing value with an expand factor. Again, the expand factor used is two (2). Once the new spacing value is calculated, the list is parsed between the button item and the item below the button item to identify every SVth item (step 625) and the identified items are inserted in the display between the button item and the item below the button item (step 630) and the process returns to step 530.

If one of the local contract buttons 230 is selected instead (steps 530 and 700), then the ID number of the item associated with the selected button (i.e., the ID number of the button item) would be determined (step 710). The ID number of the item below the button item would also be determined (step 715) and a new spacing value (SV) calculated by multiplying the current spacing value with an expand factor. lust as before, the contract factor used is two (2). Once the new spacing value is calculated, the master list is parsed between the button item and the item below the button item to identify every SVth item (step 625) and only the identified items are drawn to the screen between the button item and the item below the button item (step 730) and the process returns to step 530.

Note that although the global and local expand factors as well as the global and local contract factors used in the present invention are two (2), any other factor can be used for any one of the expand or contract processes. Indeed, every single one of the factors may be made user configurable.

In operation, suppose the master list includes one thousand (1000) objects, since most screens can display twenty (20) lines of items, the spacing value (SV) is then fifty (50). Accordingly, the initial compression scheme comprises of displaying every fiftieth (50th) item in the list on the screen. In FIG. 3, the first five (5) items of the twenty (20) items that will be displayed are shown. That is, alpha, the first item in the master list, is displayed as item one (1). Gamma, the fiftieth (50th) item is displayed as item two (2). Noah, the 100th item is displayed as item three (3). Radio the 150th item and zebra the 200th item are displayed as items 4 and 5, respectively. Of course, fifteen (15) additional items will be displayed.

Now suppose that the listing is alphabetical and the user wants to find lambda. Since, lambda is between gamma and noah, the user needs to scroll the list until the space between gamma and noah is at the center of the view pane. Then, the user can either use the global expand button 210 or the local expand button 240 associated with gamma. If the global button 210 is used, then the new spacing value (SV) will be the current spacing value (which is 50) divided by the expansion factor (which is 2). Thus, the new SV will be 25. Hence, each displayed item will be 25 items away from each other. Consequently, there will an item inserted between each pair of displayed item. For example, an item will be inserted between alpha (item 1) and gamma (item 50), between gamma (item 50) and noah (item 100), between noah (item 100) and radio (item 150) and so on. Of course, if lambda is the 75th item in the list, lambda will be displayed between gamma (the 50th item) and noah (the 100th item).

If on the other hand, the local expand button 240 associated with gamma is used, then the process will know that it only needs to take into consideration gamma (the 50th item) and noah (the 100th item). Then a new spacing value will be calculated by dividing the current spacing value (which is 50) by the expansion factor (which is 2). Again, the new spacing value will be 25. But here, only the 75th item will be inserted in the list of displayed item; and of course it will be displayed between gamma (the 50th item) and noah (the 100th item).

Note that both the global and the local buttons may be used in conjunction to each other. For example, suppose a master list is massively compressed, the global expand button can be continually used until the user has a definite idea of where the item of interest is before using the local expand button. Clearly, one need not scroll or display all the files in the list, the majority of which may not be of any interest at that particular time.

Figure 6:
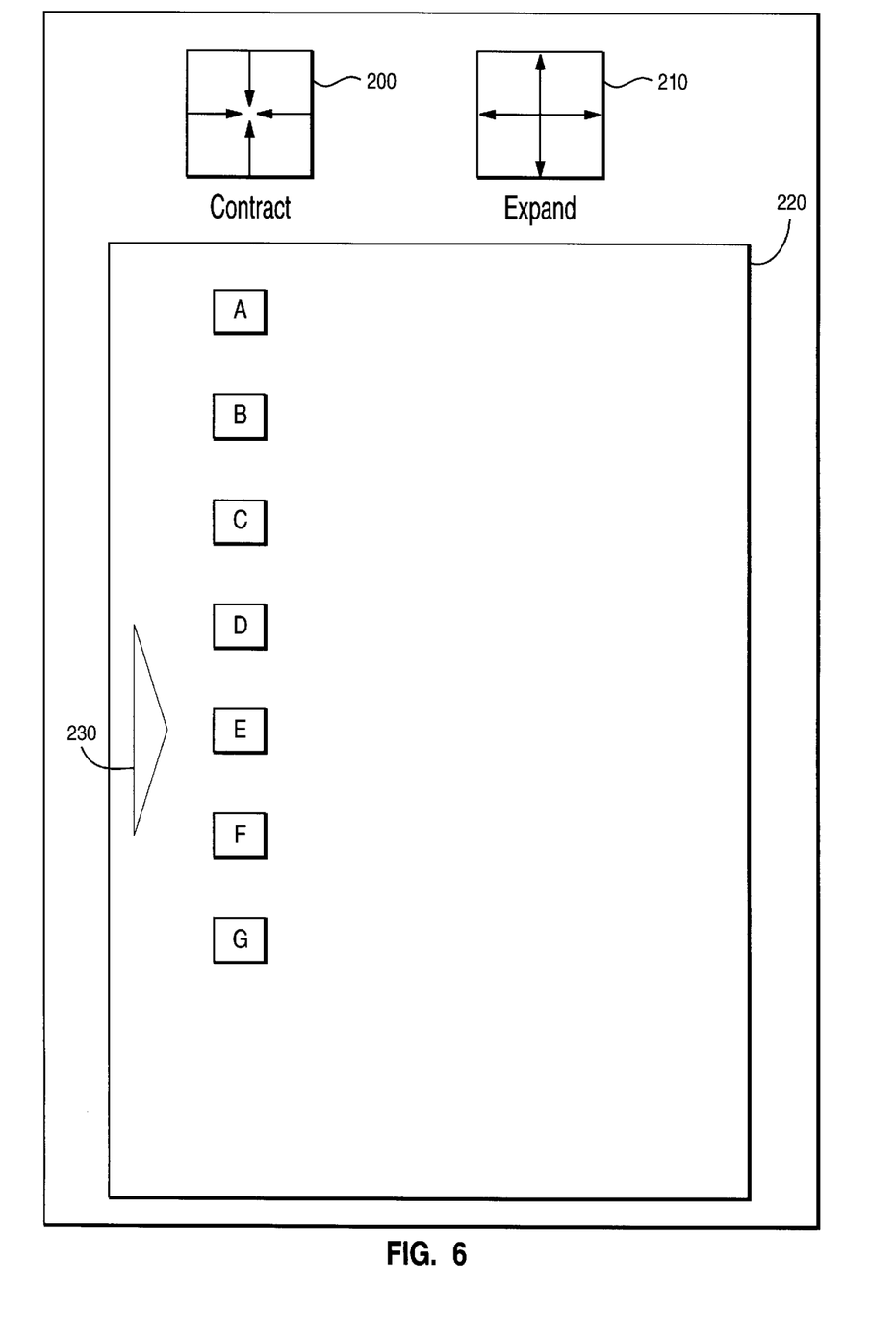
FIG. 6 is an illustration of a compressed list of items.
Figure 9:
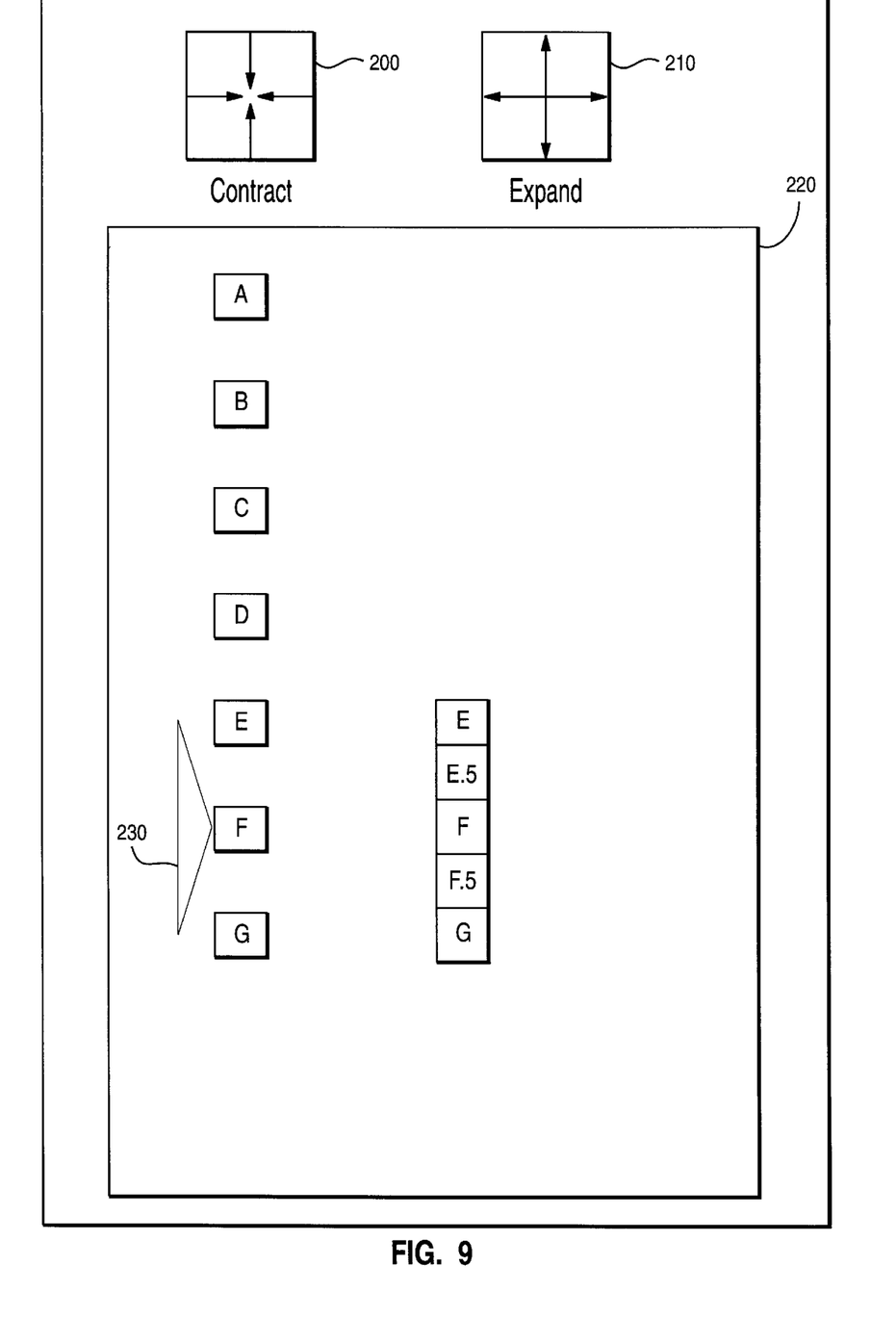

A user may quickly want to expand areas above and below an item by using a pointer. FIG. 6 is an illustration of a compressed list of items. In FIG. 6, there is also shown a pointer 230. Although the pointer 230 is shown to have a triangular shape, it is obvious to those of ordinary skill in the art that it can be of any shape imaginable without departing from the scope of the present invention. When any part of the pointer 230 shares coordinates with an item (the touched item), the item half way between the touched item and the item immediately below and the item immediately above the touched item will be displayed. For example in FIG. 9, item F shares coordinates with the pointer 230. Accordingly, item E.5 which is half way between items E and F is displayed. In addition, item F.5, half way between items F and G, is also displayed. Note that although the new items are shown to be displayed to the right of the originally displayed items, they are in actuality inserted between the originally displayed items.

Figure 7:
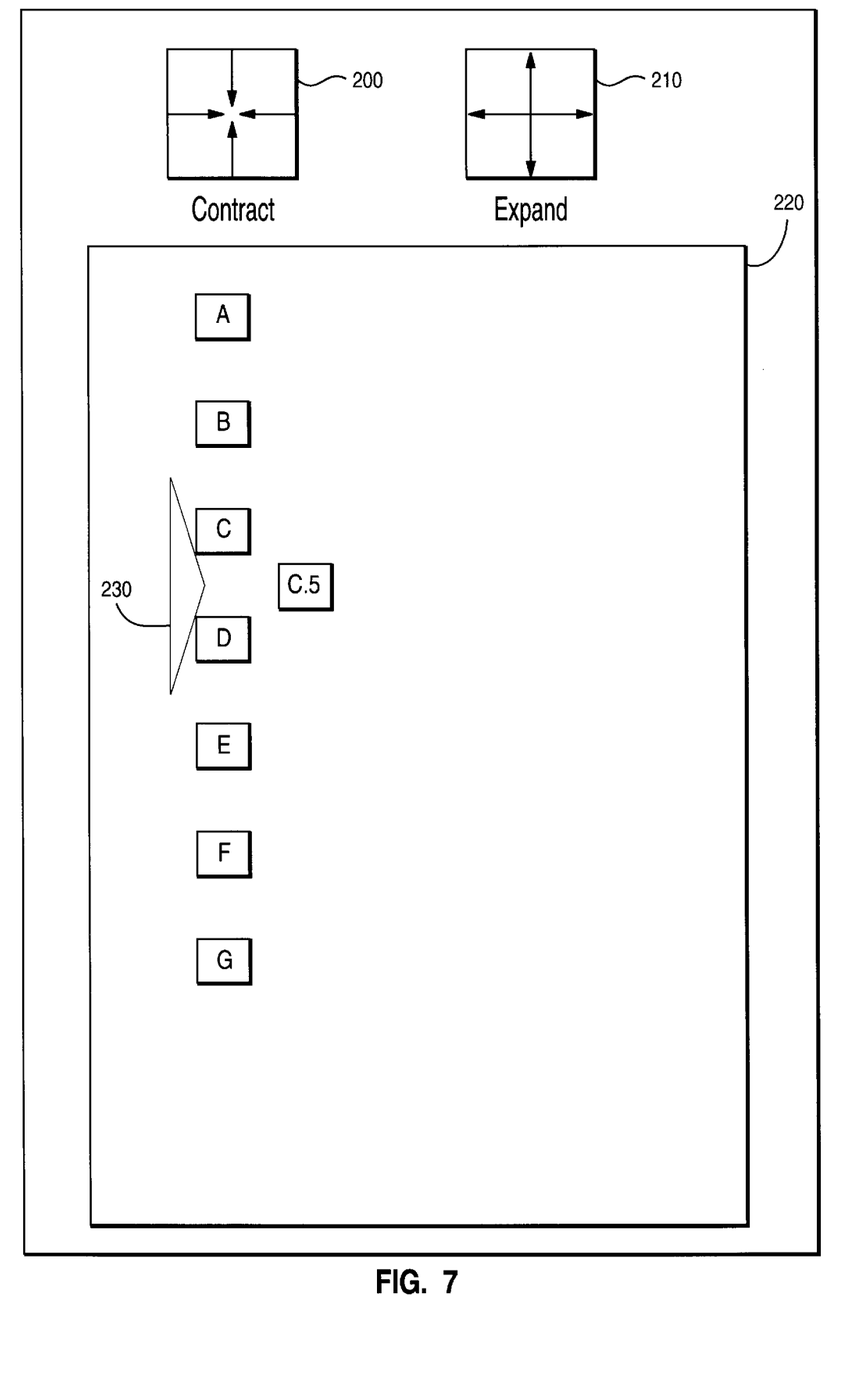
FIGS. 7, 8 and 9 are examples of a list expansion using a pointer.
Figure 8:
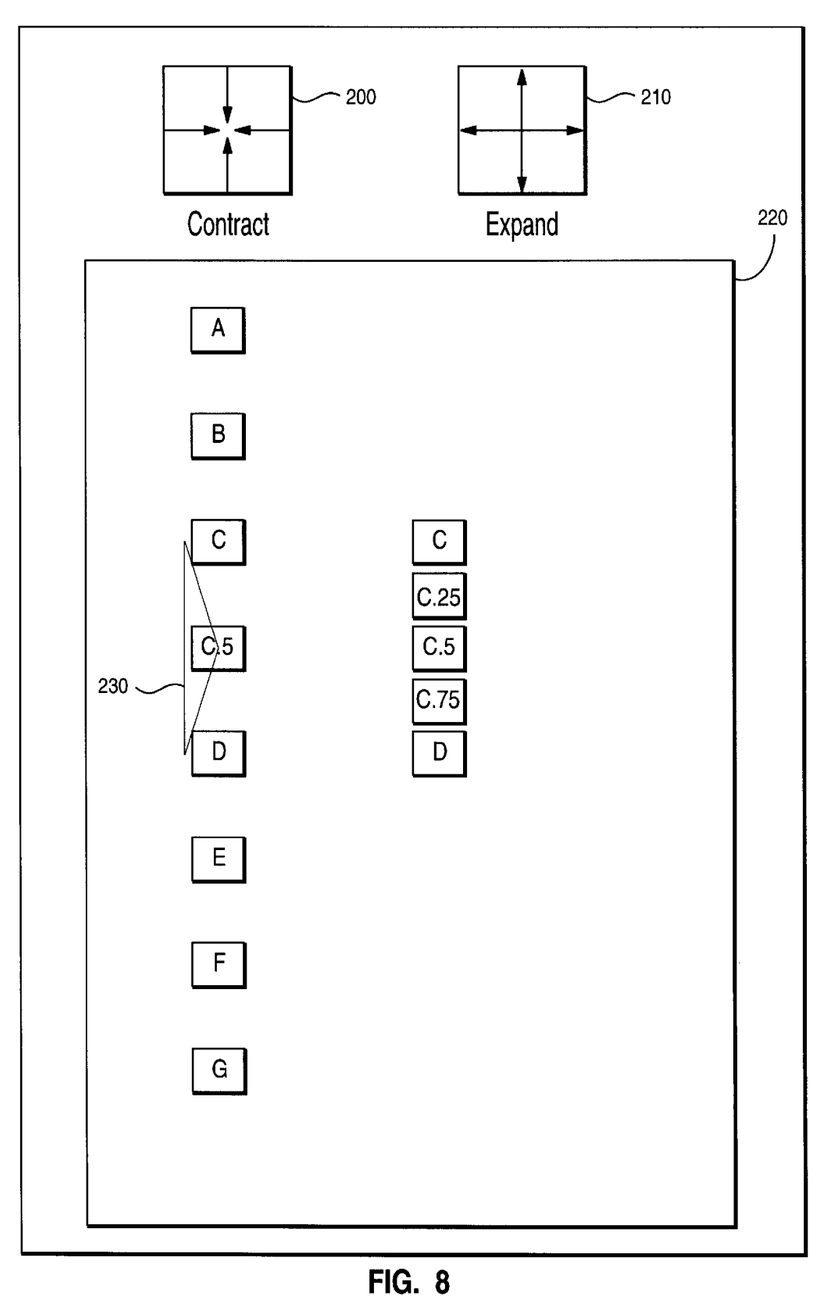

If the pointer shares coordinates with two displayed items, the item half way between the two items will be displayed as shown in FIG. 7. In FIG. 7, the pointer 230 shares coordinates with both items C and D; consequently, item C.5, half way between items C and D, is displayed. If the pointer shares coordinates with three items, then the item located half way between each pair of items will be displayed as shown in FIG. 8. In FIG. 8, the pointer 230 shares coordinates with items C, C.5 and D; accordingly, item C.25 and item C.75 are displayed.

Figure 10:
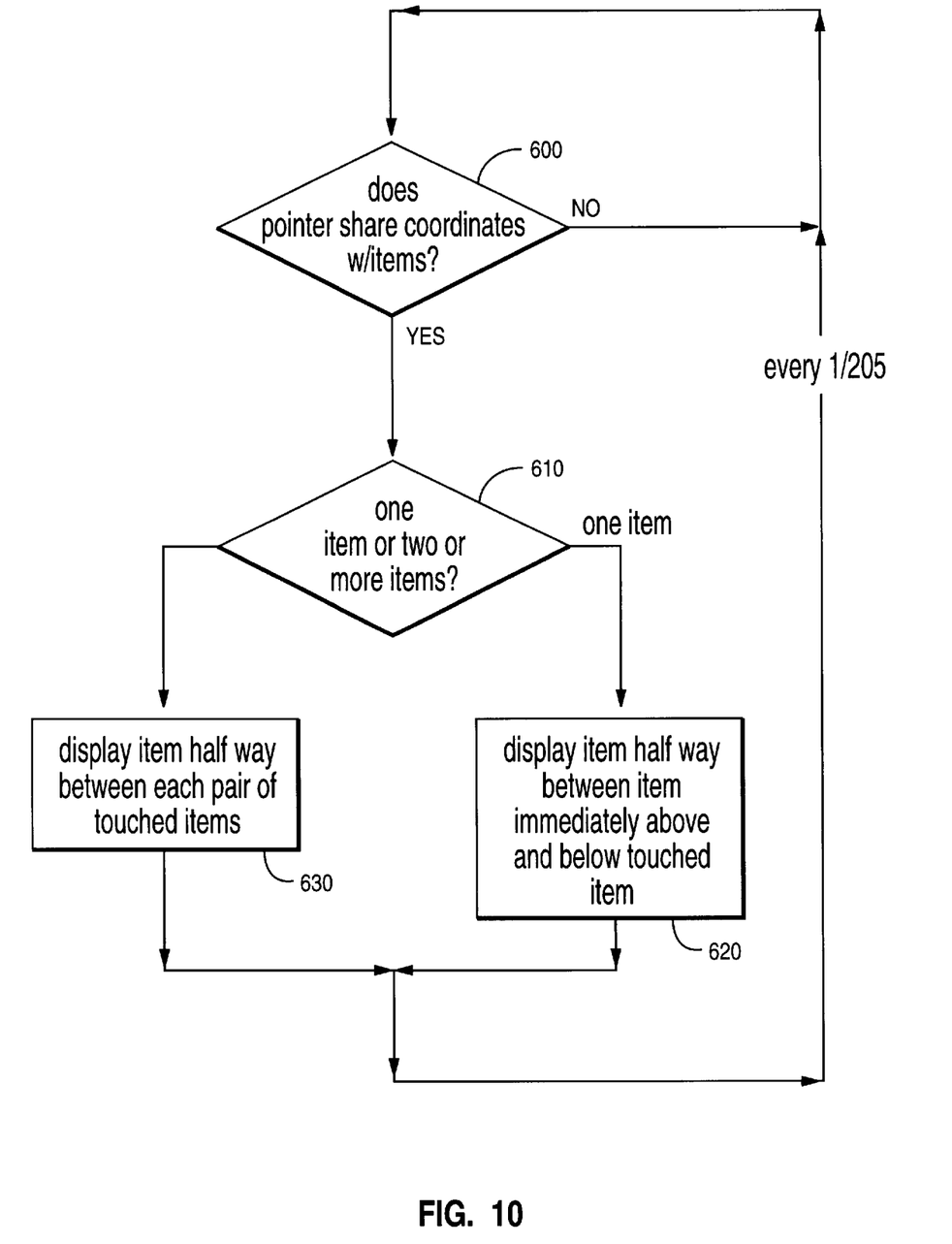
FIG. 10 is a flowchart of a method of expanding a list using a pointer.

FIG. 10 is a flowchart of a method of expanding a list using a pointer. Every one-twentieth (1/20) of a second, a check is made as to whether the pointer 230 shares coordinates with any one of the items of a compressed list (step 600). It is well known in the art to do coordinate checking. For example, a coordinate check is done each time a user switches from one window to another using the mouse. Hence, coordinate checking is not explained further.

If the pointer 230 does not share coordinates with any one of the items, the process remains at step 600; otherwise, the process moves to step 610 where it is determined whether the pointer 230 shares coordinates with one or more items. If the pointer 230 shares coordinates with one item, then the item half way between item immediately above and below the touched item is displayed (step 620). But, if the pointer 230 shares coordinates with more than one item, then the item half way between each pair of touched item is displayed (step 630). This process repeats itself every one-twentieth (1/20) of a second.

The present invention has been fully described above with reference to specific embodiments, however, other alternative embodiments may be apparent to those of ordinary skill in the art. Therefore, the above description should not be taken as limiting the scope of the present invention defined by the appended claims.

What is claimed is:

1. A method of expanding a compressed list of items on a display system comprising the steps of:

displaying said compressed list of items; and expanding said displayed compressed list of items by displaying a non-displayed item halfway between two displayed items when a pointer simultaneously touches said two displayed items.

2. The method of claim 1 wherein if said pointer touches one displayed item, a non-displayed item halfway between said one displayed item and a displayed item immediately above and below said one displayed item is displayed.

3. The method of claim 1 wherein if said pointer simultaneously touches three displayed items, a non-displayed item halfway between each pair of said three displayed items is displayed.

4. An apparatus for expanding a compressed list of items on a display system comprising:

means for displaying said compressed list of items; and means for expanding said displayed compressed list of items by displaying a non-displayed item halfway between two displayed items when a pointer simultaneously touches said two displayed items.

5. The apparatus of claim 4 wherein if said pointer touches one displayed item, a non-displayed item halfway between said one displayed item and a displayed item immediately above and below said one displayed item is displayed.

6. The apparatus of claim 4 wherein if said pointer simultaneously touches three displayed items, a non-displayed item halfway between each pair of said three displayed items is displayed.

7. A computer program product for expanding a compressed list of items on a display system comprising:
   program code means for displaying said compressed list of items; and
   program code means for expanding said displayed compressed list of items by displaying a non-displayed item halfway between two displayed items when a pointer simultaneously touches said two displayed items.

8. The computer program product of claim 7 wherein if said pointer touches one displayed item, a non-displayed item halfway between said one displayed item and a displayed item immediately above and below said one displayed item is displayed.

9. The computer program product of claim 7 wherein if said pointer simultaneously touches three displayed items, a non-displayed item halfway between each pair of said three displayed items is displayed.

* * * * *